2,998,388
HEAT TRANSFER
William A. La Lande, Jr., Philadelphia, and John F. Gall, Narberth, Pa., assignors to Pennsalt Chemicals Corporation, a corporation of Pennsylvania
No Drawing. Filed Dec. 19, 1956, Ser. No. 629,238
6 Claims. (Cl. 252—67)

This invention relates to heat transfer. In particular it relates to a heat transfer medium comprising perchloryl fluoride, $ClO_3F$, and to a process for refrigerating with said medium.

The transfer of heat from a system at one temperature level to a system at a lower or higher temperature level by means of a vaporizing liquid is old in the art. A wide variety of liquids are known in the art to be useful heat transfer agents for such practice. Examples of these are water, hydrocarbon oils, ammonia, liquid metals, e.g. mercury and sodium, and various synthetic organic compounds, especially chlorofluorocarbons. In the practice of heat transfer, the selection of a particular heat transfer medium for a specific service requires careful consideration of both the physical and chemical characteristics of the system in which the medium is to be used and of the heat transfer medium used therein. The temperature differential between the heat energy levels in the system to be heated or cooled is, for example, a very important equipment design characteristic. The physical properties of the vaporizing liquid used in a particular system, for example, the boiling point, the latent heat of vaporization and the vapor pressures attained by the vapors, generally define the temperature range in which the liquid medium will be useful.

When the heat transfer medium is used as a refrigerant in a compression type refrigeration system, pressure-temperature-volume relationship are important. These relationships must be such that suitable evaporator and condenser pressures result at the required temperature conditions. The freezing point of the liquid is also important. It must be below the lowest temperature attained in the evaporator in a particular refrigeration service. The critical temperature of the vapor, another important factor, must be well above the temperature of the cooling medium supplied to the condenser.

Adverse inherent physical properties, such as flammability, explosiveness, toxicity, and objectionable odor are undesirable in a heat transfer medium, and absence of these is mandatory in most heat transfer services. Chemically, the corrosiveness, stability to decomposition, and reactivity of the heat transfer medium with the elements of its environment must also be at a minimum to characterize the medium as a commercially useful heat transfer agent, especially for refrigerant use.

We have now found that the inherent physical and chemical properties of perchloryl fluoride make it a valuable component of a heat transfer medium comprising the compound, and have invented a process for using the properties of perchloryl fluoride in heat transfer service.

The heat transfer medium of our invention comprises perchloryl fluoride. The compound perchloryl fluoride is a colorless gas at ordinary temperatures. It boils at $-53.5°$ F. at atmospheric pressure under standard conditions. It freezes at $-230.8°$ F. Its vapor pressure at 75° F. is about 150 p.s.i.g. Perchloryl fluoride has attributes which make it a valuable and useful constituent of a heat transfer medium comprising said perchloryl fluoride, especially for low temperature refrigeration service. Perchloryl fluoride is non-flammable, non-explosive, and stable to shock. It is exceptionally stable even at temperatures as high as 900° F. It is stable to a high degree under conditions of hydrolysis. $ClO_3F$ contains no non-gaseous elements in its molecular structure, such as carbon, silicon or metallic elements, therefore no deposits of solids of any type can form from its residual products should decomposition ever occur.

$ClO_3F$ is non-corrosive to most metals, alloys and materials used for the construction of equipment used in low temperature refrigeration systems or in heat transfer systems at higher temperatures. Aluminum, aluminum alloys, brass, copper, steel, stainless steel, magnesium and zinc have been found to withstand exposure to perchloryl fluoride long periods of time without any indications of chemical attack to the metals.

$ClO_3F$ has a toxicity of about the same order as that of chlorinated hydrocarbons. It is classified as to degree of hazard as "moderate, grade 7–8" (for rating scale interpretation see J. Industr. Hyg. and Tox. 31, vol. 6, pages 343–346, November 1949). As to odor, $ClO_3F$ has a very characteristic, not unpleasant, odor which is detectable at 2 to 10 p.p.m., far below the toxicity limit. Another advantageous feature of $ClO_3F$ is that it does not react chemically with the desiccant materials usually used in connection with refrigerants, e.g. alumina gel and silica gel.

Still another desirable inherent property of $ClO_3F$ is its low compression ratio. Compression ratio is defined as the ratio of the vapor pressure of a material in p.s.i.a. at 86° F. to its vapor pressure at 5° F. A low ratio is preferred in refrigeration practice. The compression ratio of $ClO_3F$, 3.7, therefore, compares very favorably with that of 4.94 for ammonia and that of about 4.1 for monochlorodifluoromethane. Furthermore, the low liquid viscosity of $ClO_3F$, 0.17 centipoises at 30° C., compares favorably with that of 0.009 for ammonia and of 0.229 for monochlorodifluoromethane at the same temperature.

In its chemical reactivity $ClO_3F$ is an oxidant chemical, and although it will not burn, it will support combustion. At room or elevated temperatures it will combine readily with oxidizable materials such as hydrocarbons and lubricating oils and greases of the hydrocarbon type. This potential disadvantage to the use of $ClO_3F$ in lubricated refrigeration systems is overcome in the process of our invention by the use of fluorocarbon lubricating materials, for example, Kel–F oils, proprietary polymonochlorotrifluoroethylene oils with freezing points of $-70°$ F. and lower.

The heat transfer process of our invention makes use of the remarkable properties of perchlorylfluoride in a heat transfer medium comprising perchloryl fluoride. Our process comprises heating or cooling in a closed system a heat transfer medium comprising perchloryl fluoride and bringing the hot or cold heat transfer medium, as liquid or vapor, into heat exchange contact with a heat transfer surface at a different temperature level, and, in cases where the vapor is used, condensing said vapor to a liquid and returning it to a vaporizer.

The process of our invention may be used for refrigeration or for heating; however, it is especially useful in low temperature industrial refrigeration operations where service temperatures of about −20° F. to −150° F. are required. Operations in the plastics industry, where quick cooling of polymerizing compounds to interrupt polymerization is needed, and in some metallurgical operations where quick-cooling of molten metal is required to obtain controlled crystal growth, are typical of services where such requirements exist and where a low temperature coolant is advantageous to provide heat removal rapidly on a massive basis. Temperatures in the desired range are readily obtained by using the refrigerant of our invention as the heat transfer medium.

Our heat transfer medium, comprising perchloryl fluoride, is particularly adapted for use in a reciprocating compressor system because of the low vapor volume and high vapor pressure of perchloryl fluoride. The latent heat of vaporization of perchloryl fluoride, 86.13 B.t.u. per lb. at −46.8° F., though only moderate, is advantageous in that the flow rates of the vapor will be high and throttling controls and orifices can be made comparatively large in cross-sectional area. The advantage of this is that it makes operating control less sensitive to changes and avoids possibilities of plugging of the orifices by ice crystals.

The operation of the heat transfer process of our invention using our heat transfer medium comprising perchloryl fluoride is similar to the operation of other vapor compression systems of heat transfer. The heat transfer medium, enclosed in a pressure-tight system, is changed from the liquid to the vapor phase by absorbing heat at a low pressure and is then changed from the vapor to the liquid phase by heat removal at an elevated pressure. The operation is cyclic and continuous.

Perchloryl fluoride can be used either alone as the heat transfer medium in the practice of our invention or it can be blended in most proportions with one or more other heat transfer agents to form compositions useful in heat transfer. The heat transfer agents used in said compositions are materials which are chemically inert in the presence of perchloryl fluoride in the practical working ranges in which the compositions are used. Heat transfer agents which we have found particularly compatible with perchloryl fluoride in compositions for heat transfer, both for heating and cooling, but especially for refrigerating, are the highly halogenated hydrocarbons commonly used as refrigerants, preferably the chlorofluorocarbons of methane and ethane. Of these materials, those which we have found especially useful for the preparation of the heat transfer compositions of our invention include trichloromonofluoromethane, dichlorodifluoromethane, monochlorotrifluoromethane, tetrafluoroethane, dichloromonofluoromethane, monochlorodifluoromethane, 1,1,2-trichloro-1,2,2-trifluoroethane, 1,2-dichloro-1,1,2,2-tetrafluoroethane, and 1-chloro-1,1,2,2,2-pentafluoroethane.

For example, from 1 to 99 parts by weight of perchloryl fluoride can be blended with from 99 to 1 part by weight of the following chlorofluorocarbons taken separately or in combination: trichloromonofluoromethane, monofluorotrichloromethane, 1,1,2-trichloro-1,2,2-trifluoroethane, and 1,2-dichloro-1,1,2,2-tetrafluoroethane. The resulting heat transfer compositions can be used in heat transfer service to at least 250° C. with no reaction occurring between the perchloryl fluoride and the chlorofluorocarbon, as evidenced by infra-red analysis of the mixture before and after heating. Lower temperature service limits of a particular composition will, of course, depend on the freezing point of the composition. Refrigerant service conditions below −70° F. may readily be obtained by a composition comprising from 1 to 99 parts by weight of perchloryl fluoride and from 99 to 1 part by weight of monochlorodifluoromethane. Other highly halogenated hydrocarbons may also be blended in similar proportions with perchloryl fluoride to form refrigerant compositions and used advantageously in low temperature refrigeration service. Dichloromonofluoromethane and 2-chloro-1,1,1-trifluoroethane have been found especially practical for such service.

The invention and its practice is further shown by the following examples.

*Example 1*

About equal volumes of perchloryl fluoride and trichloromonofluoromethane were blended and passed through a glass tube packed with glass helices at a temperature of 265–287° C. The gases were cooled and subjected to infra-red analysis. No reaction or decomposition of the original gases was found.

*Example 2*

Perchloryl fluoride and monochlorotrifluoromethane were blended in equal volumes and passed through the furnace of Example 1 at 257–278° C. Infra-red analysis of the cooled gases leaving the furnace showed no reaction of the gases had occurred. The gas blend was liquefied and cooled to about −175° C. without freezing.

*Example 3*

Perchloryl fluoride and 1,1,2-trichloro-1,2,2-trifluoroethane were blended in about equal volumes and passed through the furnace of Example 1 at 259–283° C. No reaction or decomposition of the gases was found on infra-red analysis of the cooled gases from the furnace.

*Example 4*

Perchloryl fluoride and 1,2-dichloro-1,1,2,2-tetrafluoroethane were blended in about equal volumes and passed through the furnace of Example 1 at 269–295° C. Infra-red analysis showed no reaction or decomposition of the gases had occurred.

*Example 5*

A heat transfer medium comprising perchloryl fluoride is charged as a liquid to the coolant system of a low temperature synthetic rubber polymerization vessel. As the polymerization reaction proceeds, the liquid absorbs the heat of polymerization and is vaporized. The vapors are compressed and the cooled liquid returned to the polymerizer heat exchanger system. Temperatures of polymerization in the range below −10° F. are thus readily maintained within narrow limits. A perfluorocarbon lubricant is used in mechanical parts of the coolant system where contact of the lubricant and the refrigerant are likely to occur.

*Example 6*

A heat transfer medium comprising perchloryl fluoride and 1,2-dichloro-1,1,2,2-tetrafluoroethane in about equal parts by volume is charged and used as the refrigerant in a low temperature industrial refrigerant system utilizing a reciprocating type compressor and designed to operate at service temperatures as low as −150° F. A perfluorocarbon lubricant of suitably low freezing point is employed for lubrication of the compressor.

Other modifications of this invention will be obvious to those skilled in the art and may be introduced without departing from the scope and spirit thereof, and it is to be understood that our invention includes all such embodiments and is not to be limited by the above description.

I claim:

1. A heat transfer composition comprising from 1 to 99 parts by weight of perchloryl fluoride and from 99 to 1 part by weight of a highly halogenated hydrocarbon selected from the group consisting of trichloromonofluoromethane, dichlorodifluoromethane, monochlorotrifluoromethane, tetrafluoroethane, dichloromonofluoromethane, monochlorodifluoromethane, 1,1,2 - trichloro-1,2,2-trifluoroethane, 1,2-dichloro - 1,1,2,2 - tetrafluoroethane, and 1-chloro-1,1,2,2,2-pentafluoroethane.

2. A heat transfer composition according to claim 1 in which the highly halogenated hydrocarbon is trichloromonofluoromethane.

3. A heat transfer composition according to claim 1 in which the highly halogenated hydrocarbon is monochlorotrifluoromethane.

4. A heat transfer composition according to claim 1 in which the highly halogenated hydrocarbon is 1,1,2-trichloro-1,2,2-trifluoroethane.

5. A heat transfer composition according to claim 1 in which the highly halogenated hydrocarbon is 1,2-dichloro-1,1,2,2-tetrafluoroethane.

6. A heat transfer composition according to claim 1 in which the highly halogenated hydrocarbon is monochlorodifluoromethane.

References Cited in the file of this patent

UNITED STATES PATENTS

| | | |
|---|---|---|
| 2,255,588 | Hubacker | Sept. 9, 1941 |
| 2,641,580 | Lewis | June 9, 1953 |
| 2,751,414 | Miller | June 19, 1956 |

OTHER REFERENCES

Inorganic and Theoretical Chemistry, Supplement II, Part I, pages 183–4, Mellor. Longman, Green and Company, London 1956.